(12) United States Patent
Rzeszutek et al.

(10) Patent No.: US 11,354,886 B2
(45) Date of Patent: *Jun. 7, 2022

(54) METHOD AND APPARATUS FOR SHELF EDGE DETECTION

(71) Applicant: SYMBOL TECHNOLOGIES, LLC, Holtsville, NY (US)

(72) Inventors: Richard Jeffrey Rzeszutek, Toronto (CA); Vlad Gorodetsky, North York (CA)

(73) Assignee: Symbol Technologies, LLC, Holtsville, NY (US)

(*) Notice: Subject to any disclaimer, the term of this patent is extended or adjusted under 35 U.S.C. 154(b) by 114 days.

This patent is subject to a terminal disclaimer.

(21) Appl. No.: 16/682,995

(22) Filed: Nov. 13, 2019

(65) Prior Publication Data

US 2020/0082202 A1 Mar. 12, 2020

Related U.S. Application Data

(63) Continuation of application No. 15/698,340, filed on Sep. 7, 2017, now Pat. No. 10,489,677.

(51) Int. Cl.
| | |
|---|---|
| *G06K 9/46* | (2006.01) |
| *G06V 10/75* | (2022.01) |
| *G06V 10/28* | (2022.01) |
| *G06V 10/44* | (2022.01) |
| *G06V 10/48* | (2022.01) |
| *G06V 20/00* | (2022.01) |
| *G06V 20/20* | (2022.01) |

(Continued)

(52) U.S. Cl.
CPC .......... *G06V 10/751* (2022.01); *G06F 16/583* (2019.01); *G06Q 10/087* (2013.01); *G06V 10/28* (2022.01); *G06V 10/44* (2022.01); *G06V 10/48* (2022.01); *G06V 20/00* (2022.01); *G06V 20/20* (2022.01); *G06V 10/473* (2022.01); *G06V 10/759* (2022.01)

(58) Field of Classification Search
CPC .... G06K 9/6202; G06K 9/00624; G06K 9/38; G06K 9/4633; G06K 9/00671; G06K 9/4604; G06K 2009/485; G06K 2009/6213; G06F 16/583; G06Q 10/087; G06T 7/136; G06T 7/13
See application file for complete search history.

(56) References Cited

U.S. PATENT DOCUMENTS 5,662,113 A * 9/1997 Liu .................... G06T 5/003
 382/128
9,417,058 B1 * 8/2016 Lina .................. G06T 7/521
(Continued)

*Primary Examiner* — Solomon G Bezuayehu

(57) ABSTRACT

A method of label detection includes: obtaining, by an imaging controller, an image depicting a shelf; increasing an intensity of a foreground subset of image pixels exceeding an upper intensity threshold, and decreasing an intensity of a background subset of pixels below a lower intensity threshold; responsive to the increasing and the decreasing, (i) determining gradients for each of the pixels and (ii) selecting a candidate set of the pixels based on the gradients; overlaying a plurality of shelf candidate lines on the image derived from the candidate set of pixels; identifying a pair of the shelf candidate lines satisfying a predetermined sequence of intensity transitions; and generating and storing a shelf edge bounding box corresponding to the pair of shelf candidate lines.

16 Claims, 11 Drawing Sheets

(51) Int. Cl.
    *G06F 16/583* (2019.01)
    *G06Q 10/08* (2012.01)
    *G06V 10/46* (2022.01)

(56) References Cited

U.S. PATENT DOCUMENTS

| | | | | |
|---|---|---|---|---|
| 2002/0097439 | A1* | 7/2002 | Braica | G06T 5/20 |
| | | | | 358/3.26 |
| 2005/0251039 | A1* | 11/2005 | Chalana | G06T 7/143 |
| | | | | 600/437 |
| 2006/0235301 | A1* | 10/2006 | Chalana | G06K 9/32 |
| | | | | 600/443 |
| 2008/0181529 | A1* | 7/2008 | Michel | G06T 5/003 |
| | | | | 382/266 |
| 2008/0199099 | A1* | 8/2008 | Michel | G06T 5/002 |
| | | | | 382/260 |
| 2009/0303353 | A1* | 12/2009 | Noh | H04N 5/3572 |
| | | | | 348/234 |
| 2010/0060910 | A1* | 3/2010 | Fechter | G06K 9/00449 |
| | | | | 358/1.9 |
| 2015/0195496 | A1* | 7/2015 | Hayakawa | B60R 1/00 |
| | | | | 348/118 |
| 2016/0239942 | A1* | 8/2016 | Usman | G06T 5/00 |
| 2017/0200430 | A1* | 7/2017 | Lin | G09G 3/20 |
| 2017/0206422 | A1* | 7/2017 | Delbruck | G06T 7/73 |
| 2019/0035056 | A1* | 1/2019 | Chuang | G06T 5/003 |
| 2019/0333211 | A1* | 10/2019 | Johansson | G06K 9/00127 |
| 2021/0383550 | A1* | 12/2021 | Yu | G06T 7/12 |

\* cited by examiner

METHOD AND APPARATUS FOR SHELF EDGE DETECTION

CROSS-REFERENCE TO RELATED APPLICATIONS

This application is a continuation of U.S. patent application Ser. No. 15/698,340, entitled Method and Apparatus For Shelf Edge Detection," filed on Sep. 7, 2017, which is incorporated herein by reference in its entirety.

BACKGROUND

Environments in which inventories of objects are managed, such as products for purchase in a retail environment, may be complex and fluid. For example, a given environment may contain a wide variety of objects with different sizes, shapes, and other attributes. Such objects may be supported on shelves in a variety of positions and orientations. The variable position and orientation of the objects, as well as variations in lighting and the placement of labels and other indicia on the objects and the shelves, can render detection of structural features, such as the edges of the shelves, difficult.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
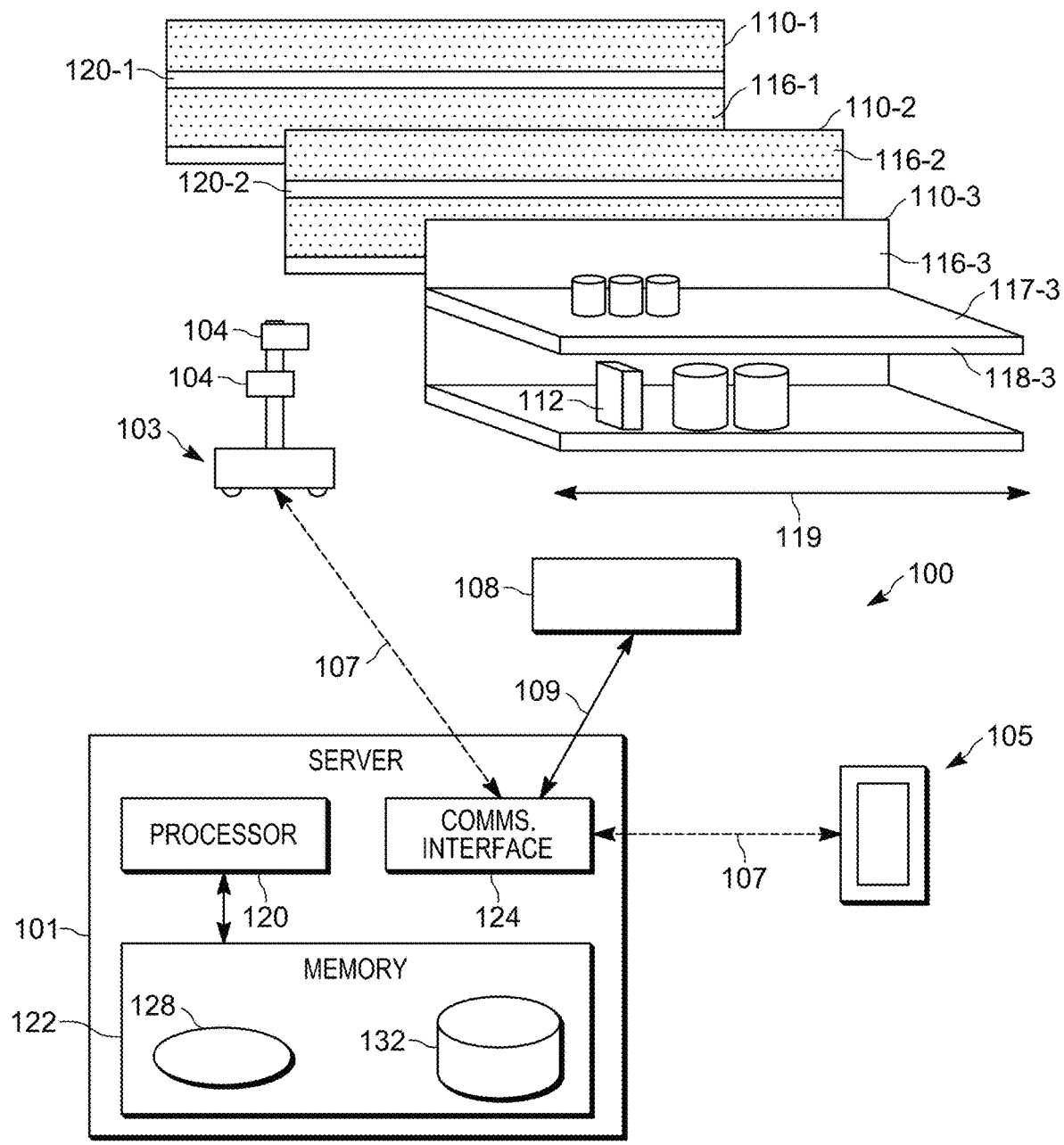
FIG. 1 is a schematic of a mobile automation system.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

In retail environments in which a plurality of products is supported on shelves, mobile automation systems may be configured to capture images of the shelves and determine, from the images, various information concerning the products. For example, price labels may be located and decoded within the image, for use in ensuring that products are labelled with the correct prices. Further, gaps between products on the shelves may be identified as potentially indicating that one or more products are out of stock and require replenishment. The above determinations may require the identification of shelf edges (i.e., the substantially vertical surfaces at which the substantially horizontal support surfaces of the shelves terminate; the shelf edges facing into aisles in the retail environment) in the images for use as reference structures for the identification of labels, products, gaps, and the like. Additionally, in certain embodiments, a mobile automation apparatus relies on identification of shelf edges to aid its navigation within the retail environment.

The identification of shelf edges from image data is complicated by a variety of factors, including the proximity to the shelf edges of products having a wide variety of shapes, colors and orientations. Such factors also include lighting variations, reflections, obstructions from products or other objects, and the like. Further, the shelf edges may have various other elements, such as product labels, placed thereon, which alters the appearance of portions of the shelf edges in images.

Examples disclosed herein are directed to method of detecting a shelf edge by an imaging controller, comprising: obtaining, by the imaging controller, an image depicting a shelf; increasing an intensity of a foreground subset of image pixels in the image, wherein each pixel in the foreground subset of pixels has an initial intensity that exceeds an upper intensity threshold, and decreasing an intensity of a background subset of pixels in the image, wherein each pixel in the background subset of pixels has an initial intensity that is below a lower intensity threshold; responsive to the increasing and the decreasing, (i) determining gradients for each of the pixels and (ii) selecting a candidate set of the pixels based on the gradients; overlaying a plurality of shelf candidate lines on the image derived from the candidate set of pixels; identifying a pair of the shelf candidate lines satisfying a predetermined sequence of intensity transitions; and generating a shelf edge bounding box corresponding to the pair of shelf candidate lines.

Further examples disclosed herein are directed to a computing device for detecting shelf edges, comprising: a memory; and an imaging controller, coupled to the memory, the imaging controller including: a preprocessor configured to obtain an image depicting a shelf, and to increase an intensity of a foreground subset of pixels in the image, wherein each pixel in the foreground subset of pixels has an initial intensity that exceeds an upper intensity threshold, and decrease an intensity of a background subset of pixels in the image, wherein each pixel in the background subset of pixels has an initial intensity that is below a lower intensity threshold; a selector configured, responsive to the increasing and the decreasing, to (i) determine gradients for each of the pixels and (ii) select a candidate set of the pixels based on the gradients; a line generator configured to overlay a plurality of shelf candidate lines on the image derived from the candidate set of pixels; and a region generator configured to identify a pair of the shelf candidate lines satisfying a predetermined sequence of intensity transitions; and the imaging controller configured to generate a shelf edge bounding box corresponding to the pair of shelf candidate lines in the memory.

FIG. 1 depicts a mobile automation system 100 in accordance with the teachings of this disclosure. The system 100 includes a server 101 in communication with at least one mobile automation apparatus 103 (also referred to herein simply as the apparatus 103) and at least one client computing device 105 via communication links 107, illustrated in the present example as including wireless links. In the present example, the links 107 are provided by a wireless local area network (WLAN) deployed within the retail environment by one or more access points. In other examples, the server 101, the client device 105, or both, are located outside the retail environment, and the links 107 therefore include wide-area networks such as the Internet, mobile networks, and the like. As will be described in greater detail below, the system 100 also includes a charging dock 108 for the apparatus 103. The dock 108 is in communication with the server 101 via a link 109 that in the present example is a wired link (e.g., an Ethernet link). In other examples, however, the link 109 is a wireless link.

The client computing device 105 is illustrated in FIG. 1 as a mobile computing device, such as a tablet, smart phone or the like. In other examples, the client device 105 includes computing devices such as a desktop computer, a laptop computer, another server, a kiosk, a monitor, or other suitable device. The system 100 can include a plurality of client devices 105, each in communication with the server 101 via respective links 107.

The system 100 is deployed, in the illustrated example, in a retail environment including a plurality of shelf modules 110-1, 110-2, 110-3 and so on (collectively referred to as shelves 110, and generically referred to as a shelf 110—this nomenclature is also employed for other elements discussed herein). Each shelf module 110 supports a plurality of products 112. Each shelf module 110 includes a shelf back 116-1, 116-2, 116-3 and a support surface (e.g. support surface 117-3 as illustrated in FIG. 1) extending from the shelf back 116 to a shelf edge 118-1, 118-2, 118-3. The shelf modules 110 are typically arranged in a plurality of aisles, each of which includes a plurality of modules aligned end-to-end. In such arrangements, the shelf edges 118 face into the aisles, through which customers in the retail environment as well as the apparatus 103 may travel.

More specifically, the apparatus 103 is deployed within the retail environment, and communicates with the server 101 (via the link 107) to navigate, autonomously or partially autonomously, the length 119 of at least a portion of the shelves 110. The apparatus 103 is equipped with a plurality of navigation and data capture sensors 104, such as image sensors (e.g. one or more digital cameras) and depth sensors (e.g. one or more Light Detection and Ranging (LIDAR) sensors), and is further configured to employ the sensors to capture shelf data. In the present example, the apparatus 103 is configured to capture a series of digital images of the shelves 110, as well as a series of depth measurements, each describing the distance and direction between the apparatus 103 and one or more points on a shelf 110, such as the shelf itself or the product disposed on the shelf.

The server 101 includes a special purpose imaging controller, such as a processor 120, specifically designed to control the mobile automation apparatus 103 to capture data (e.g. images of the shelves 110), obtain the captured data via a communications interface 124 and store the captured data in a repository 132 in a memory 122. The server 101 is further configured to perform various post-processing operations on the captured data and to detect certain structural features—such as the shelf edges 118—within the captured data. The post-processing of captured data by the server 101 will be discussed below in greater detail. The server 101 may also be configured to determine product status data based in part on the above-mentioned shelf edge detections, and to transmit status notifications (e.g. notifications indicating that products are out-of-stock, low stock or misplaced) to the mobile device 105 responsive to the determination of product status data.

The processor 120 is interconnected with a non-transitory computer readable storage medium, such as the above-mentioned memory 122, having stored thereon computer readable instructions for executing control of the apparatus 103 to capture data, as well as the above-mentioned post-processing functionality, as discussed in further detail below. The memory 122 includes a combination of volatile (e.g. Random Access Memory or RAM) and non-volatile memory (e.g. read only memory or ROM, Electrically Erasable Programmable Read Only Memory or EEPROM, flash memory). The processor 120 and the memory 122 each comprise one or more integrated circuits. In an embodiment, the processor 120, further includes one or more central processing units (CPUs) and/or graphics processing units (GPUs). In an embodiment, a specially designed integrated circuit, such as a Field Programmable Gate Array (FPGA), is designed to perform the shelf edge detection discussed herein, either alternatively or in addition to the imaging controller/processor 120 and memory 122. As those of skill in the art will realize, the mobile automation apparatus 103 also includes one or more controllers or processors and/or FPGAs, in communication with the controller 120, specifically configured to control navigational and/or data capture aspects of the apparatus 103. The client device 105 also includes one or more controllers or processors and/or FPGAs, in communication with the controller 120, specifically configured to process (e.g. to display) notifications received from the server 101.

The server 101 also includes the above-mentioned communications interface 124 interconnected with the processor 120. The communications interface 124 includes suitable hardware (e.g. transmitters, receivers, network interface controllers and the like) allowing the server 101 to communicate with other computing devices—particularly the apparatus 103, the client device 105 and the dock 108—via the links 107 and 109. The links 107 and 109 may be direct links, or links that traverse one or more networks, including both local and wide-area networks. The specific components of the communications interface 124 are selected based on the type of network or other links that the server 101 is required to communicate over. In the present example, as noted earlier, a wireless local-area network is implemented within the retail environment via the deployment of one or more wireless access points. The links 107 therefore include either or both wireless links between the apparatus 103 and the mobile device 105 and the above-mentioned access points, and a wired link (e.g. an Ethernet-based link) between the server 101 and the access point.

The memory 122 stores a plurality of applications, each including a plurality of computer readable instructions executable by the processor 120. The execution of the above-mentioned instructions by the processor 120 configures the server 101 to perform various actions discussed herein. The applications stored in the memory 122 include a control application 128, which may also be implemented as a suite of logically distinct applications. In general, via execution of the control application 128 or subcomponents thereof, the processor 120 is configured to implement various functionality. The processor 120, as configured via the execution of the control application 128, is also referred to herein as the controller 120. As will now be apparent, some or all of the functionality implemented by the controller 120 described below may also be performed by preconfigured hardware elements (e.g. one or more Application-Specific Integrated Circuits (ASICs)) rather than by execution of the control application 128 by the processor 120.

Figure 2A:
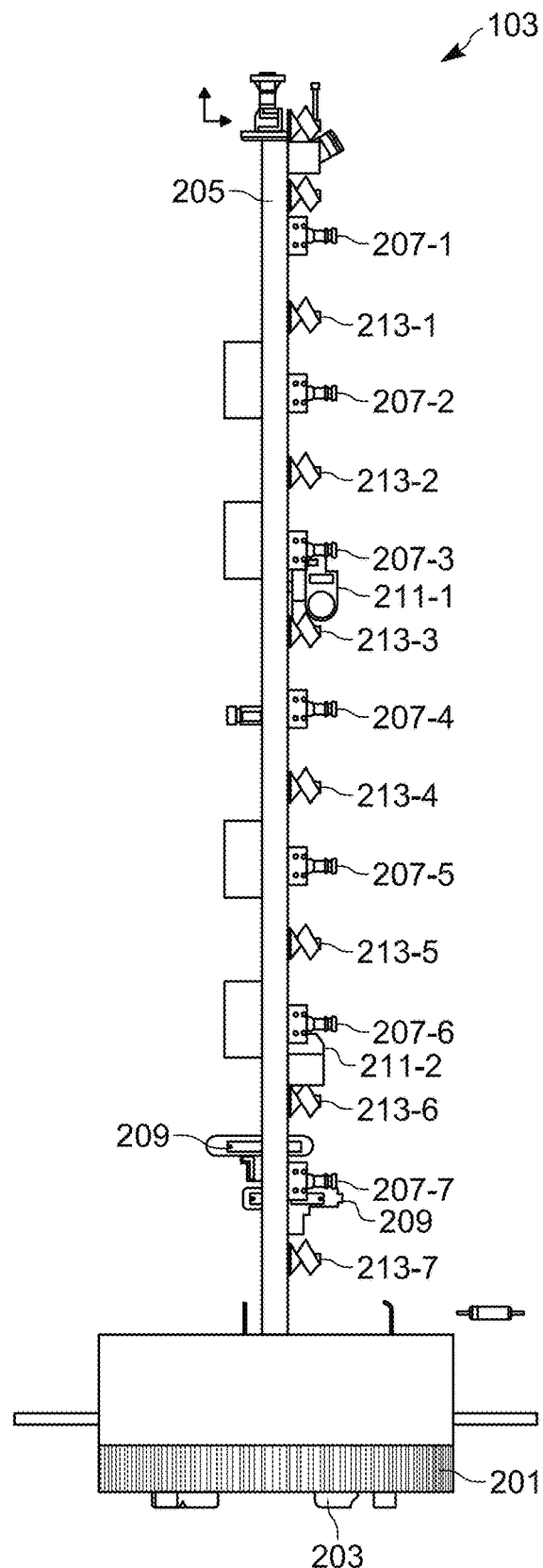
FIG. 2A depicts a mobile automation apparatus in the system of FIG. 1.
Figure 2B:
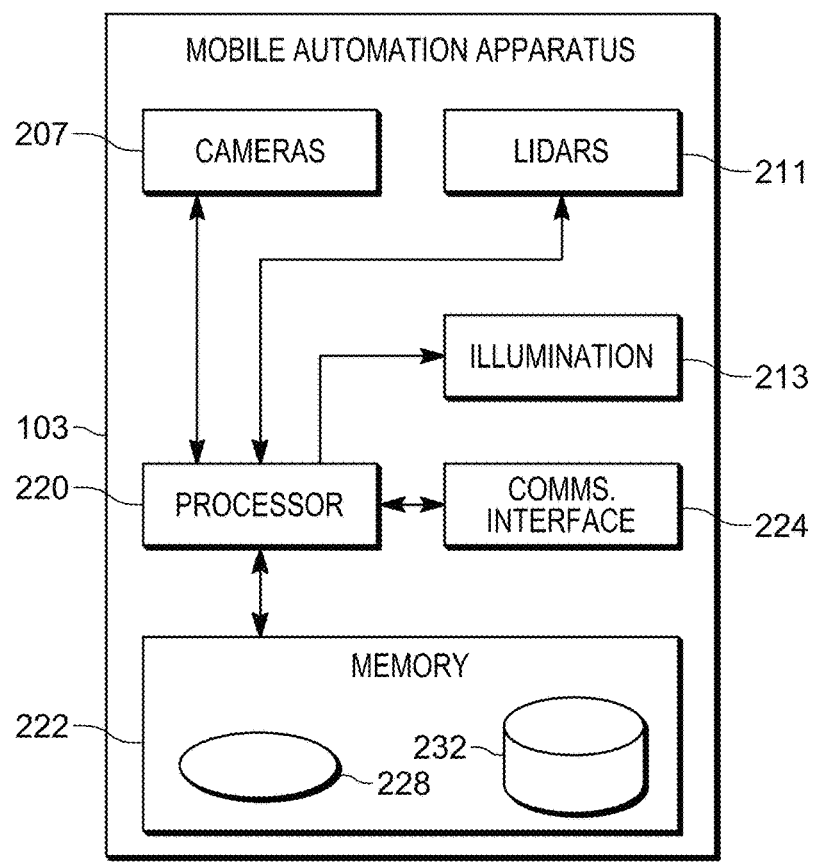
FIG. 2B is a block diagram of certain internal hardware components of the mobile automation apparatus in the system of FIG. 1.

Turning now to FIGS. 2A and 2B, the mobile automation apparatus 103 is shown in greater detail. The apparatus 103 includes a chassis 201 containing a locomotive mechanism 203 (e.g. one or more electrical motors driving wheels, tracks or the like). The apparatus 103 further includes a sensor mast 205 supported on the chassis 201 and, in the present example, extending upwards (e.g., substantially vertically) from the chassis 201. The mast 205 supports the sensors 104 mentioned earlier. In particular, the sensors 104 include at least one imaging sensor 207, such as a digital camera, as well as at least one depth-sensing sensor 209, such as a 3D digital camera. The apparatus 103 also includes additional depth sensors, such as LIDAR sensors 211. In other examples, the apparatus 103 includes additional sensors, such as one or more RFID readers, temperature sensors, and the like.

In the present example, the mast 205 supports seven digital cameras 207-1 through 207-7, and two LIDAR sensors 211-1 and 211-2. The mast 205 also supports a plurality of illumination assemblies 213, configured to illuminate the fields of view of the respective cameras 207. That is, the illumination assembly 213-1 illuminates the field of view of the camera 207-1, and so on. The sensors 207 and 211 are oriented on the mast 205 such that the fields of view of each sensor face a shelf 110 along the length 119 of which the apparatus 103 is travelling. The apparatus 103 is configured to track a location of the apparatus 103 (e.g. a location of the center of the chassis 201) in a common frame of reference previously established in the retail facility, permitting data captured by the mobile automation apparatus to be registered to the common frame of reference.

To that end, the mobile automation apparatus 103 includes a special-purpose controller, such as a processor 220, as shown in FIG. 2B, interconnected with a non-transitory computer readable storage medium, such as a memory 222. The memory 222 includes a combination of volatile (e.g. Random Access Memory or RAM) and non-volatile memory (e.g. read only memory or ROM, Electrically Erasable Programmable Read Only Memory or EEPROM, flash memory). The processor 220 and the memory 222 each comprise one or more integrated circuits. The memory 222 stores computer readable instructions for execution by the processor 220. In particular, the memory 222 stores a control application 228 which, when executed by the processor 220, configures the processor 220 to perform various functions related to the navigation of the apparatus 103 (e.g. by controlling the locomotive mechanism 203) and to the detection of shelf edges in data captured by the sensors (e.g. the cameras 207). The application 228 may also be implemented as a suite of distinct applications in other examples.

The processor 220, when so configured by the execution of the application 228, may also be referred to as a controller 220 or, in the context of shelf edge detection from captured data, as an imaging controller 220. Those skilled in the art will appreciate that the functionality implemented by the processor 220 via the execution of the application 228 may also be implemented by one or more specially designed hardware and firmware components, such as FPGAs, ASICs and the like in other embodiments.

The memory 222 may also store a repository 232 containing, for example, a map of the environment in which the apparatus 103 operates, for use during the execution of the application 228. The apparatus 103 may communicate with the server 101, for example to receive instructions to initiate data capture operations, via a communications interface 224 over the link 107 shown in FIG. 1. The communications interface 224 also enables the apparatus 103 to communicate with the server 101 via the dock 108 and the link 109.

In the present example, as discussed below, one or both of the server 101 (as configured via the execution of the control application 128 by the processor 120) and the mobile automation apparatus 103 (as configured via the execution of the application 228 by the processor 220), are configured to process image data captured by the mobile automation apparatus 103 to identify portions of the captured data depicting the shelf edges 118. In further examples, the image data processing discussed below may be performed on a computing device other than the server 101 and the mobile automation apparatus 103, such as the client device 105. The image data processing mentioned above will be described in greater detail in connection with its performance at the server 101, via execution of the application 128.

Figure 2C:
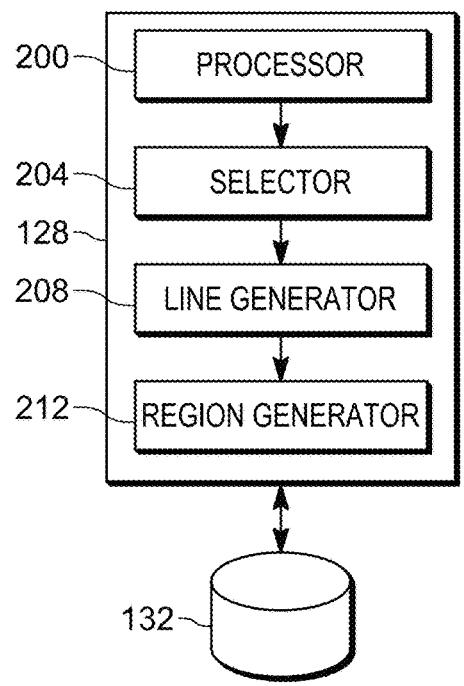
FIG. 2C is a block diagram of certain internal hardware components of the server in the system of FIG. 1.

Turning now to FIG. 2C, before describing the operation of the application 128 to identify the shelf edges 118 from captured image data, certain components of the application 128 will be described in greater detail. As will be apparent to those skilled in the art, in other examples the components of the application 128 may be separated into distinct applications, or combined into other sets of components. Some or all of the components illustrated in FIG. 2C may also be implemented as dedicated hardware components, such as one or more ASICs or FPGAs. For example, in one embodiment, to improve reliability and processing speed, at least some of the components of FIG. 2C are programmed directly into the imaging controller 120, which may be an FPGA or an ASIC having circuit and memory configuration specifically designed to optimize image processing of a high volume of sensor data received from the mobile automation apparatus 103. In such an embodiment, some or all of the control application 128, discussed below, is an FPGA or an ASIC chip.

The control application 128 includes an image preprocessor 200 configured to obtain an image depicting a portion of the shelves 110 and the products 112 supported thereon, and to preprocess the image, for example by adjusting the contrast of the image. The control application 128 also includes a selector 204 configured to select a candidate set of pixels from the preprocessed image (i.e., the output of the preprocessor 200); as will be discussed below, the candidate set of pixels are pixels in the image that have an increased likelihood of depicting shelf edges 118. The control application 128 also includes a line generator 208 configured to generate and overlay shelf candidate lines derived from the candidate set of pixels on the image. The shelf candidate lines, as will be seen below, represent potential locations within the preprocessed image that depict shelf edges 118. Further, the control application 128 includes a region generator 212 configured, using the shelf candidate lines, to identify regions of the preprocessed image that are likely to depict the shelf edges 118.

Figure 3:
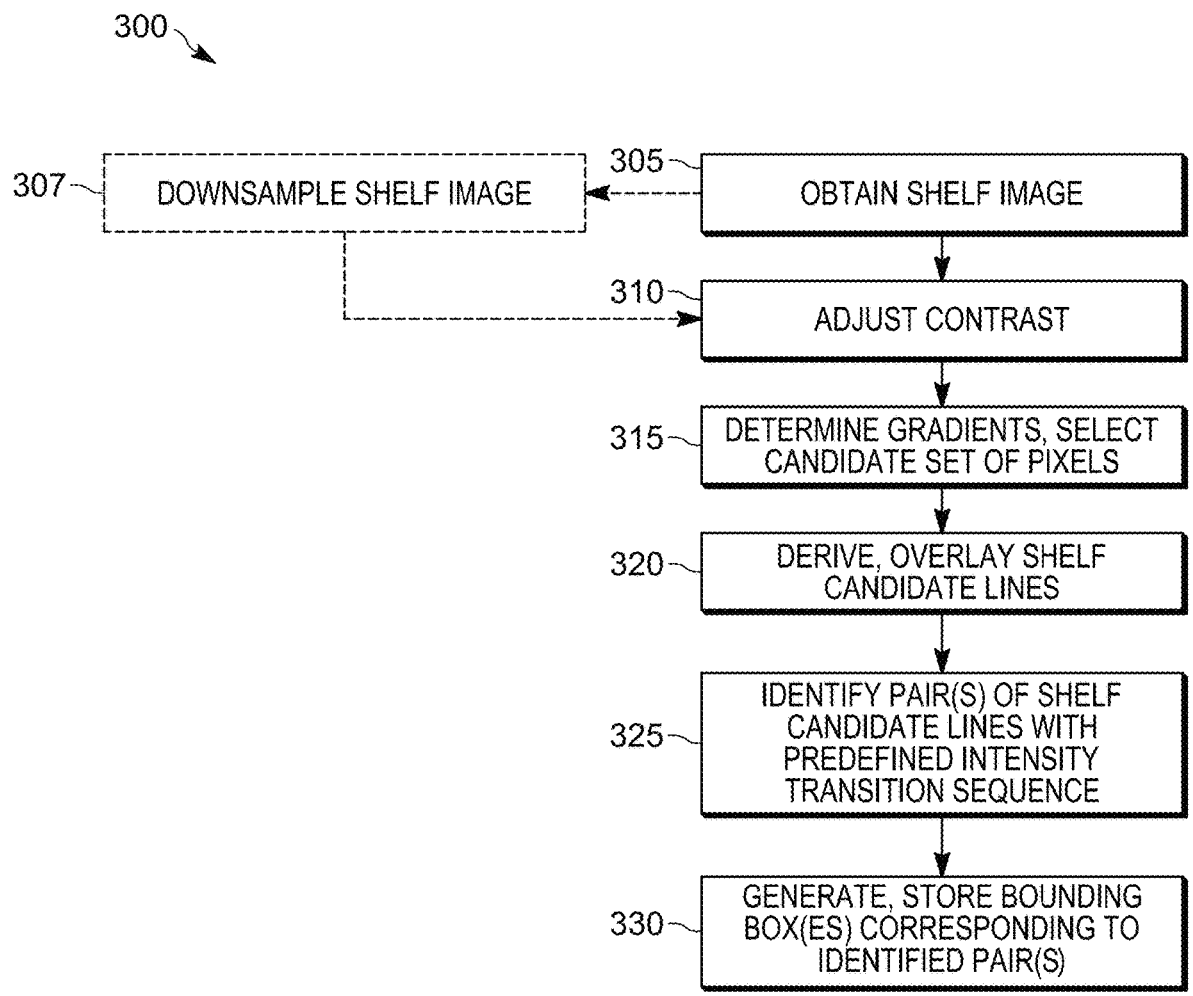
FIG. 3 is a flowchart of a method of shelf edge detection.

The functionality of the control application 128 will now be described in greater detail. Turning to FIG. 3, a method 300 of shelf edge detection is shown. The method 300 will be described in conjunction with its performance on the system 100 and with reference to the components illustrated in FIG. 2C. As noted earlier, however, in other examples, some or all of the method 300 is performed by the components illustrated in FIG. 2B.

At block 305, the controller 120, and particularly the preprocessor 200 of the control application 128, is configured to obtain a digital image of one or more shelf modules 110 and the products 112 supported thereon. The image obtained at block 305 is, for example, captured by the apparatus 103 and stored in the repository 132. The preprocessor 200 is therefore configured, in the above example, to obtain the image by retrieving the image from the repository 132.

Figure 4:
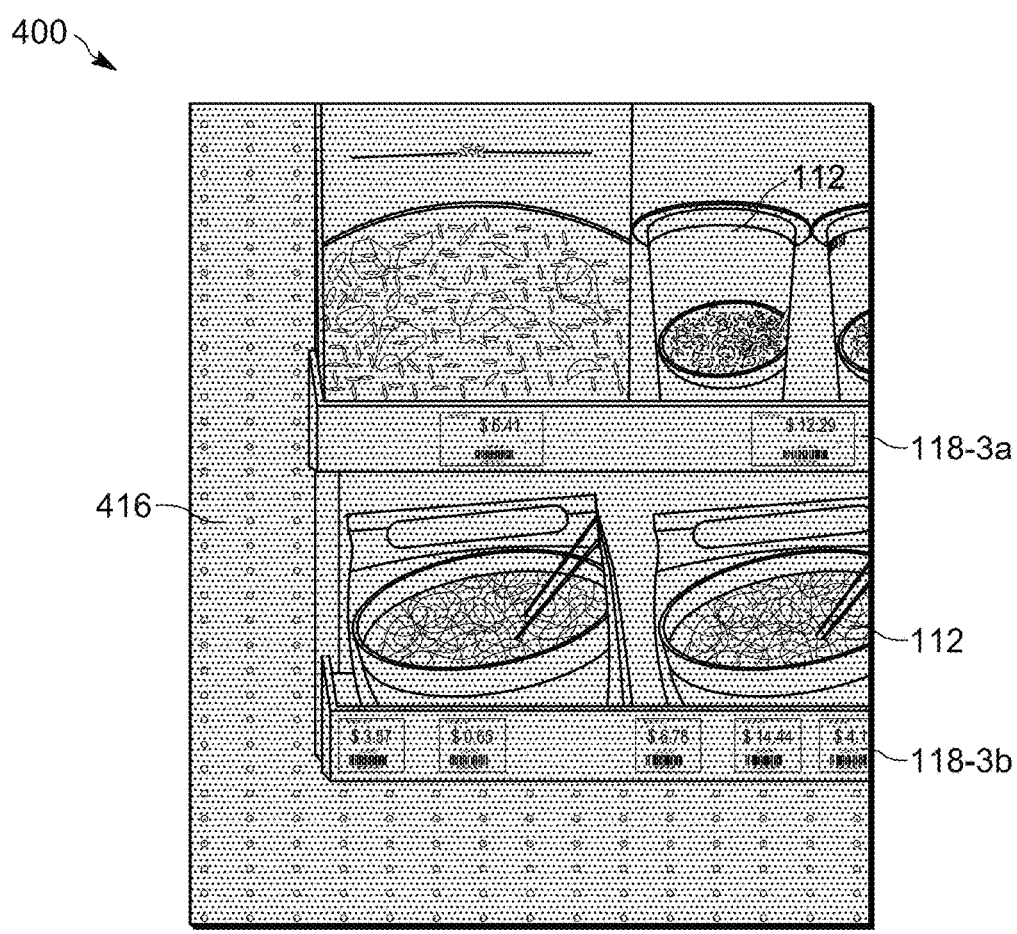
FIG. 4 is an example shelf image obtained in the performance of the method of FIG. 3.

An example image 400 is illustrated in FIG. 4, depicting portions of two shelf edges 118-3a and 118-3b, as well as products 112 supported by the support surfaces (not visible in FIG. 4) corresponding to each shelf edge 118. As noted earlier, each shelf edge 118 is depicted in the image 400 as an elongated rectangular, substantially vertical, surface facing an aisle in which the shelf is located (i.e., facing the apparatus 103, which travels along the aisle to capture the image 400). A shelf back 416 is also visible in the image 400.

At block 307, having obtained the image 400, the preprocessor 200 may also be configured to downsample the image 400 before further processing is performed to detect the shelf edges 118 in the image 400. For example, the preprocessor 200 can be configured at block 307 to generate a downsampled version of the image 400 with a resolution of about one tenth of the original resolution of the image 400 (e.g., a downsampled version having a resolution of about 0.5 megapixels may be generated from an original image having a resolution of about 5 megapixels). Other suitable degrees of downsampling may also be implemented, dependent on the resolution of the original image. In the discussion below, the processing functions performed by the control application 128 are referred to as being performed on the image 400. It is assumed that, when block 307 is performed, those processing functions are performed on the downsampled version of the image 400. When the block 307 is omitted, those processing functions are instead performed on the original image 400.

From block 305 or block 307, the performance of the method 300 proceeds to block 310, at which the control application 128, and particularly the preprocessor 200, is configured to adjust the contrast of the image 400. As will be apparent, each pixel in the image 400 has an intensity level. The nature of the intensity level is dependent on the data format employed by the image 400. For example, the intensity level can be expressed as a value between zero, corresponding to black, and 255, corresponding to white. In other examples, the intensity value can be expressed as a value between 0, corresponding to black, and 1, corresponding to white. In further examples, the intensity value can be expressed as a value between 0 (black) and 65535 (white).

The preprocessor 200 is configured to identify at least two subsets of pixels in the image 400: a foreground subset, the pixels of which each have an original intensity that exceeds an upper intensity threshold; and a background subset, the pixels of which have an original intensity that falls below a lower intensity threshold. The preprocessor 200 is configured, having identified the above subsets, to increase the intensity of the foreground pixels, and to decrease the intensity of the background pixels. In the present example, the intensities of the foreground subset of pixels are increased to a common upper level; more particularly, the intensities of the foreground subset of pixels are increased to a maximum level (e.g. 255, or white). The intensities of the background subset, on the other hand, are decreased to a common lower level, which in the present example is a minimum level (e.g., 0, or black).

The identification of foreground and background subsets of pixels may be performed by comparing the intensity of each pixel of the image 400 to a predefined upper intensity threshold and a predefined lower intensity threshold. In other examples, the upper and lower intensity thresholds are determined dynamically for each image processed according to the method 300 (i.e. for each performance of the method 300). Further, in addition to the foreground and background subsets of pixels, the preprocessor 200 is configured in some examples to identify an intermediate subset of pixels (e.g., all pixels not identified as members of either the foreground subset or the background subset) having intensities between the above-mentioned upper and lower intensity thresholds, and to adjust the intensities of the pixels in the intermediate subset to a range of values between the maximum and minimum levels mentioned above.

Figure 5A:
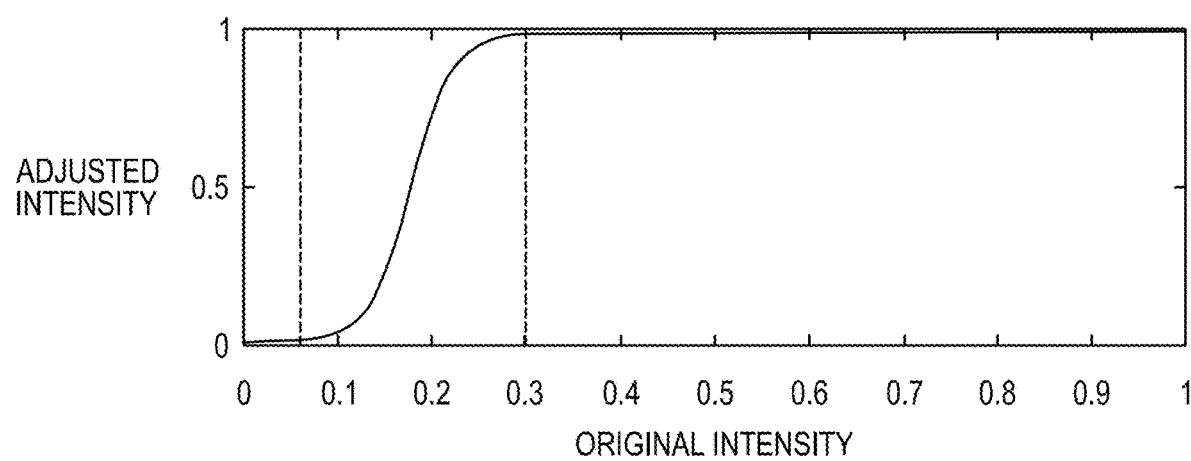
FIG. 5A is an example sigmoid curve function employed to adjust pixel intensities in the image of FIG. 4.

In the present example, the foreground, background and intermediate subsets of pixels are identified and adjusted through the application of a sigmoid curve intensity adjustment function to the image 400. Turning to FIG. 5A, an example sigmoid curve function is illustrated. When the preprocessor 200 adjusts pixel intensities based on such a curve, the curve maps the original intensity (horizontal axis in FIG. 5A) of each pixel to an adjusted intensity (vertical axis in FIG. 5A). As will be apparent, the pixel intensities are shown as values between 0 and 1, rather than between 0 and 255. For the example function of FIG. 5A, such a mapping results in any pixel having an original intensity greater than about 0.3 being adjusted to an intensity of 1 (i.e., white). As will be understood by those skilled in the art, the original and adjusted intensities may vary from the examples given above depending on the data format employed by the image 400. Pixels with original intensities above about 0.3 are the foreground subset. Application of the function shown in FIG. 5A also results in any pixel with an intensity below about 0.06 being adjusted to an intensity of 0 (i.e., black). Pixels with original intensities below about 0.06 are the background subset. Finally, pixels with original intensities between about 0.06 and about 0.3 are members of the intermediate subset, and are adjusted according to the curve shown in FIG. 5A.

Figure 5B:
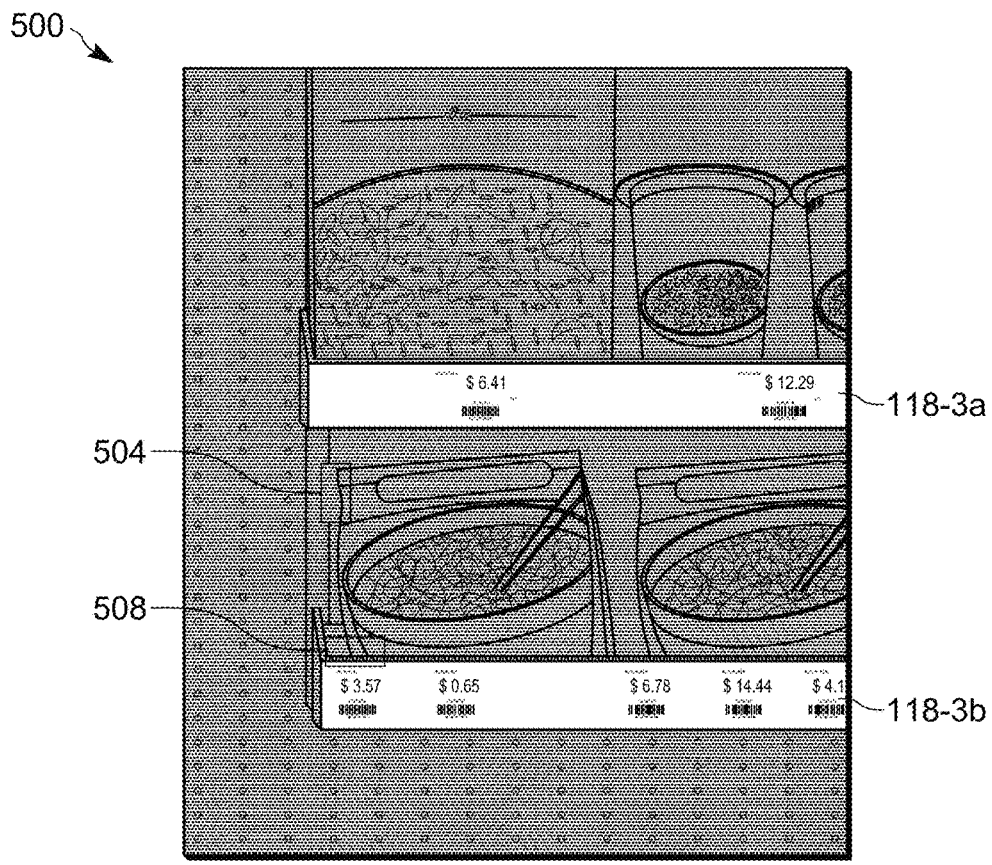
FIG. 5B is an adjusted version of the image of FIG. 4, obtained via application of the adjustment function of FIG. 5A.

FIG. 5B illustrates an adjusted image 500 generated by applying the adjustment function of FIG. 5A to the image 400. As seen in FIG. 5B, the distribution of intensities in the image 500 is weighted more heavily toward outer extremes (i.e., toward white and black) than in the image 400. The above-noted adjustments based on the upper and lower intensity thresholds are based on an assumption that ambient light (that is, light from environmental sources other than the apparatus 103 itself) is either absent, or is at a significantly lower (e.g. by two or more orders of magnitude) intensity than illumination of the shelves 110 provided by the apparatus 103. The above assumption, combined with the knowledge that the apparatus 103 travels along aisles of shelves 110 to capture the image 400 and other images, indicates that the objects closest to the apparatus 103 at the time of image capture will appear as the brightest objects in the captured image. Further, it is assumed that the shelf edges 118, being the furthest extent of each shelf toward the aisle, are the closest (or among the closest) objects to the apparatus 103 during image capture. It follows that the shelf edges 118 are expected to be among the brightest objects (i.e. having the highest intensities) shown in the captured images. Therefore, the contrast adjustment performed at block 310 emphasizes the brightest objects in the image 400 (which are presumed to include the shelf edges 118) by further brightening them, while de-emphasizing the darkest objects in the image 400 (which are presumed not to include the shelf edges 118) by further darkening them.

Figure 6:
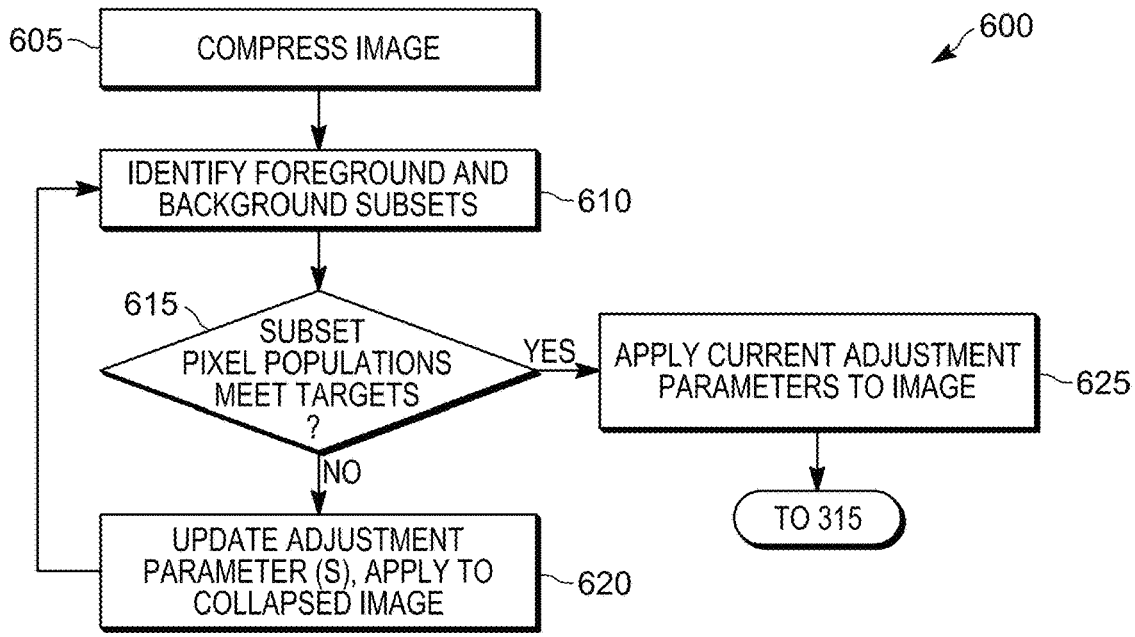
FIG. 6 is a method of determining adjustment parameters for the generation of the image of FIG. 5B.

In some examples, the parameters defining the sigmoid curve may be predefined within the preprocessor 200. In other examples, one or more of the parameters defining the sigmoid curve may be determined based on the image 400 itself. Turning to FIG. 6, a method 600 of performing block 315 is shown, in which the preprocessor 200 is configured to update contrast adjustment parameters dynamically.

At block 605, the preprocessor 200 is configured to compress the generate a compressed version of the image 400. As will be apparent in the discussion below, the image 400 is not replaced with the compressed version, as the compressed version is employed only to set contrast adjustment parameters. In the present example, the compression includes generating a single horizontal line of pixels, in which each pixel has an intensity corresponding to the median of an entire column of pixels from the image 400. At block 610, the preprocessor 200 is configured to identify foreground and background subsets of pixels in the compressed image by comparing the compressed pixel intensities to default upper and lower intensity thresholds. The default thresholds may be determined by, for example, default parameters defining the sigmoid curve adjustment function.

At block 615, the preprocessor 200 is configured to determine whether respective populations of the foreground and background subsets meet target populations. For example, the preprocessor 200 can store target populations, expressed as a fraction of the total number of pixels in the compressed image, for one or both of the foreground and background subsets. At block 615, therefore, the preprocessor 200 is configured to determine an actual population (as a fraction of the total number of pixels in the compressed image) of pixels that satisfy the default upper intensity threshold and/or the default lower intensity threshold.

When the foreground and background populations do not meet the above-mentioned targets, the performance of method 600 proceeds to block 620, at which the adjustment parameters employed to generate the default thresholds employed at block 610 are adjusted. For example, as will be apparent to those skilled in the art, a sigmoid curve is defined in part by a parameter referred to as beta, which defines the horizontal position of the curve shown in FIG. 5A along the "original intensity" axis. At block 620, therefore, the preprocessor 200 may be configured to adjust the beta parameter upward or downward, based on the comparison of the actual foreground and/or background populations to the target populations. The preprocessor 200 then returns to block 610 to identify revised foreground and background subsets based on the updated thresholds.

When the determination at block 615 is affirmative, the preprocessor 615 proceeds to block 625, at which the current adjustment parameters (i.e. those applied at the most recent performance of block 610) are applied to the entire image 400. Following adjustment of the image 400, the preprocessor 200 returns to the method 300, and specifically to block 315. The above process of updating adjustment parameters may also be applied to other sigmoid parameters, such as an alpha parameter that defines the slope of the curve shown in FIG. 5A. Further, the process shown in FIG. 6 may also be applied to adjustment functions other than a sigmoid curve.

Returning to FIG. 3, the selector 204 of the control application 128 is configured to determine gradients for each of the pixels in the contrast-adjusted image 500. In particular, the selector 204 is configured to determine at least a vertical gradient for each pixel in the adjusted image 500. In the present example, the vertical gradients are determined via the application of a Sobel filter to the adjusted image 500. The Sobel filter determines both vertical and horizontal gradients, and the horizontal gradients are discarded. Other suitable operations may also be applied to the adjusted image 500 to determine gradients. In general, as will be apparent to those skilled in the art, the gradient for each pixel is determined based on the neighbouring pixels (e.g. based on a kernel of 3×3 pixels, centered on the pixel for which the gradient is being determined), and is expressed as a vector or a derivative indicating a direction and magnitude of the greatest change in intensity from the pixel under consideration to the neighbouring pixels.

Vertical gradients are determined at block 315 in the present example because it is assumed that the shelf edges 118 are depicted horizontally in the images captured by the apparatus 103. The shelf edges 118 are therefore expected to manifest in the captured images as vertical gradients, with pixels on the shelf edges being relatively bright, and pixels above or below the shelf edges being relatively dark. For example, referring to FIG. 5B, the pixels in the region 504 will tend to exhibit weak vertical gradients and strong horizontal gradients, while the pixels in the region 508 (which coincides with a shelf edge 118) will tend to exhibit strong vertical gradients and weak horizontal gradients. More generally, therefore, the gradients determined at block 315 are those that are substantially perpendicular to an expected orientation of the shelf edges 118.

Having determined gradients for each pixel in the adjusted image 500, the selector 204 is configured to select a candidate set of edge pixels based on the gradients. In particular, the selector 204 is configured to perform a non-maximum suppression operation on the adjusted image 500 to retain only the greatest vertical gradient in each of a plurality of patches of the adjusted image 500. For example, the selector 204 may be configured to divide the adjusted image 500 into a plurality of 5×5 pixel patches, and to select only the greatest gradient in each patch for inclusion in the candidate set of pixels. The selector 204 may also apply a threshold at block 315, such that a pixel will not be included in the candidate set even if it is a local maximum if the pixel does not satisfy a minimum vertical gradient threshold. Referring again to the example shown in FIG. 5B, the candidate set of pixels will include at least some of the pixels in the region 508, but may include fewer (or none) of the pixels in the region 504. The selector 204 is configured to pass a list of the candidate set of pixels, including pixel positions and vertical gradients, to the line generator 208.

Having received the set of candidate pixels and associated gradient information, the line generator 208 is configured to overlay a plurality of shelf candidate lines on the adjusted image 500. The shelf candidate lines are derived from the candidate pixels. More specifically, each shelf candidate line contains at least a portion of the candidate set of pixels. In the present example, the line generator 208 is configured to derive the shelf candidate lines by applying a modified Hough transform to the candidate set of pixels (not to the entirety of the adjusted image 500) and their gradients determined at block 315. Typically, a Hough transform assigns each of a plurality of pixel positions and corresponding gradients (an identified edge pixel and its gradient may be referred to as an edgel) to one or more of a number of bins. Each bin corresponds to a set of parameters defining a candidate line within the source image. For example, the parameters generally include a distance p defining the distance from the origin (in the image frame of reference) to the point on the candidate line closest to the origin. The parameters generally also include an angle θ defining the angle between the horizontal axis (i.e., the x axis) and the line connecting the candidate line to the origin.

Figure 7A:
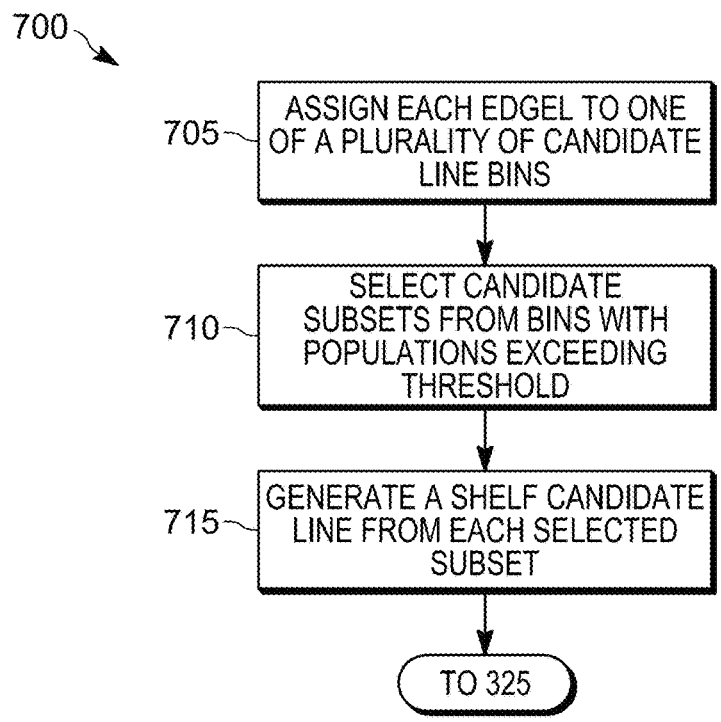
FIG. 7A is a method of generating shelf candidate lines in the performance of the method of FIG. 3.

FIG. 7A illustrates a method 700 executed by the line generator 208 in the present example to generate shelf candidate lines from the candidate set of pixels and gradients identified at block 315. At block 705, the line generator 208 is configured to assign each of the candidate set of pixels, based on its position in the adjusted image 500 and its gradient, to a single one of a plurality of bins each defining parameters for a candidate line. That is, no candidate pixel is assigned to more than one bin, in contrast with a conventional implementation of a Hough transform. In other examples, some or all of the modifications to the Hough transform discussed herein may be omitted. Further discussion of the above modifications is provided in Section 4.3.2 on pages 251-254 of "Computer Vision: Algorithms and Applications", R. Szeliski, ISBN: 978-1-84882-934-3 (2011), the content of which is incorporated herein by reference.

The assignment of candidate edgels (that is, candidate pixels combined with their respective gradients) is performed by identifying, for each edgel, which bin corresponds to a candidate line that contains the edgel or most closely fits the edgel (if no candidate lines contain the edgel). For example, the line generator 208 can be configured to determine a distance between a given edgel and the origin of the adjusted image 500, as well as an angle between the image x axis and a line extending from the origin to the edgel. The line generator 208 can be configured to then select the bin having parameters most closely matching the distance and angle determined above. The above process is repeated for each of the candidate edgels. Each bin is defined by a counter that increments for each edgel assigned to that bin. Thus, highly populated bins indicate that larger numbers of pixels fit the line parameters corresponding to those bins.

At block 710, the line generator 208 is configured to select one or more subsets of candidate pixels from the set of candidate pixels. The candidate subsets selected are those assigned to bins having pixel populations that exceed a predetermined threshold. In the present example, the line generator 208 is configured to locate local maxima (e.g. a predefined number of local maxima, such as five) among the bin counts after the performance of block 710. The line generator 208 is also configured to discard any of the above-mentioned local maxima that do not exceed the predetermined threshold.

Figure 7B:
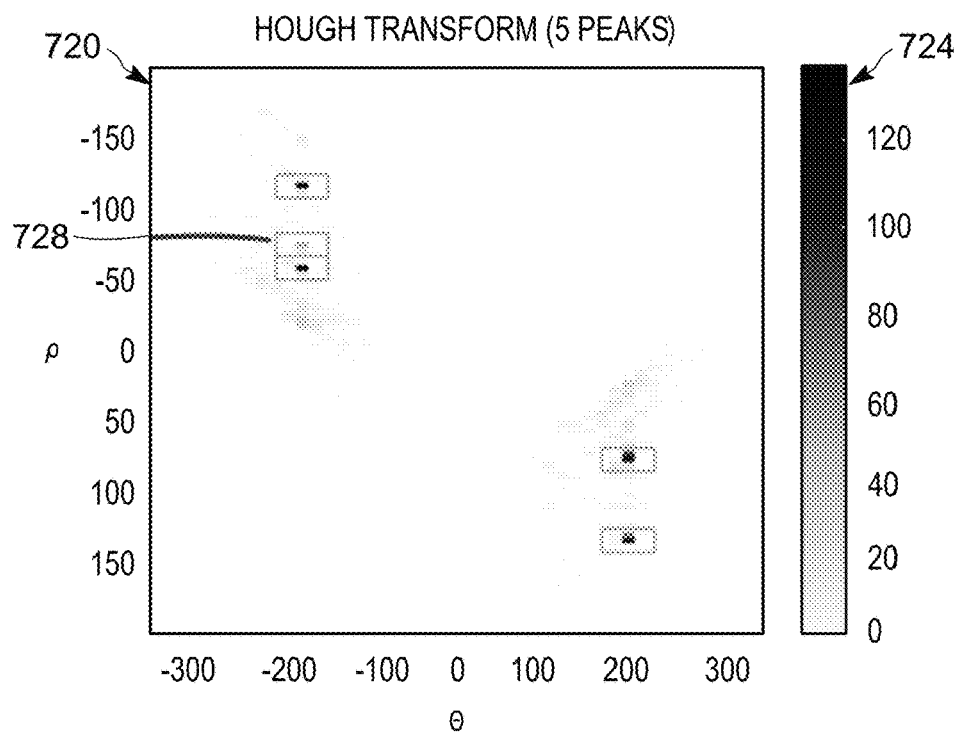
FIG. 7B is a graphical depiction of a modified Hough transform employed in the performance of the method of FIG. 7A.

Referring to FIG. 7B, example results of the modified Hough transform are shown in a heat map 720, with each point representing one bin (that is, one candidate line defined by a distance ρ and an angle θ). The intensity of the point represents the number of edges assigned to that bin, as indicated by the scale 724. Five local maxima, also referred to as peaks 728, are indicated. At block 710, the line generator 208 is configured to select five subsets of candidate pixels, corresponding to the pixels assigned to each of the bins identified as peaks 728.

Figure 8:
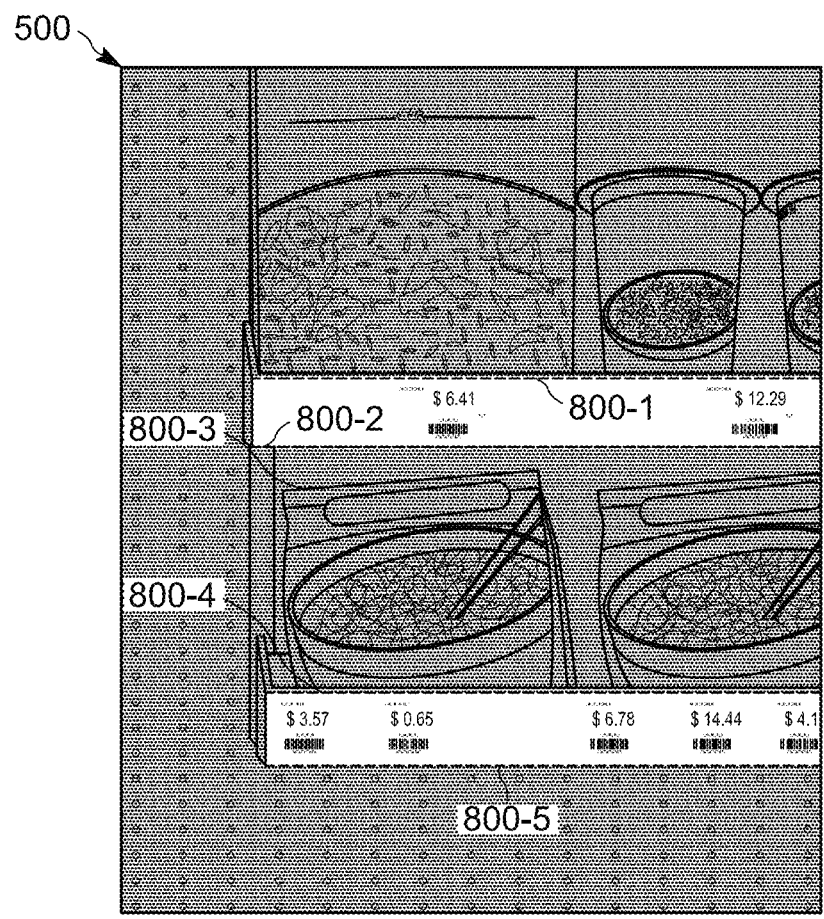
FIG. 8 shows the image of FIG. 5B with the output of the method of FIG. 7A.

At block 715, the line generator 208 is configured to generate a shelf line candidate from each selected subset of candidate pixels. As will be apparent to those skilled in the art, this approach differs from that conventionally employed with Hough transforms, in which the line parameters ρ and θ are used to generate a line. In the present example, in contrast, the line generator 208 does not make use of the parameters ρ and θ, but instead applies a suitable line-fitting operation to each subset of pixels to generate a shelf candidate line containing the pixels from the subset. Having generate the shelf candidate lines, the line generator 208 passes indications of the lines (e.g. line endpoint pixel positions within the image frame of reference) to the region generator 212. The performance of the method 700 concludes, and the performance of the method 300 continues at block 325. Turning briefly to FIG. 8, the adjusted image 500 is shown with five candidate shelf lines 800-1, 800-2, 800-3, 800-4 and 800-5 overlaid thereon, corresponding to the peaks 728 shown in FIG. 7B.

At block 325, the region generator 212 is configured to identify at least one pair of the candidate shelf lines 800 satisfying a predetermined sequence of intensity transitions. As will be apparent from FIGS. 4 and 5B, the boundaries of the shelf edges 118 appear in captured images as transitions from dark to light or from light to dark. More specifically, a transition from dark to light, followed by an opposite transition, is indicative of a shelf edge 118 between the transitions. The region generator 212 is configured to identify at least one pair of the candidate shelf lines 800 having the above-mentioned transition sequence (i.e., dark to light, followed by light to dark).

Figure 9:
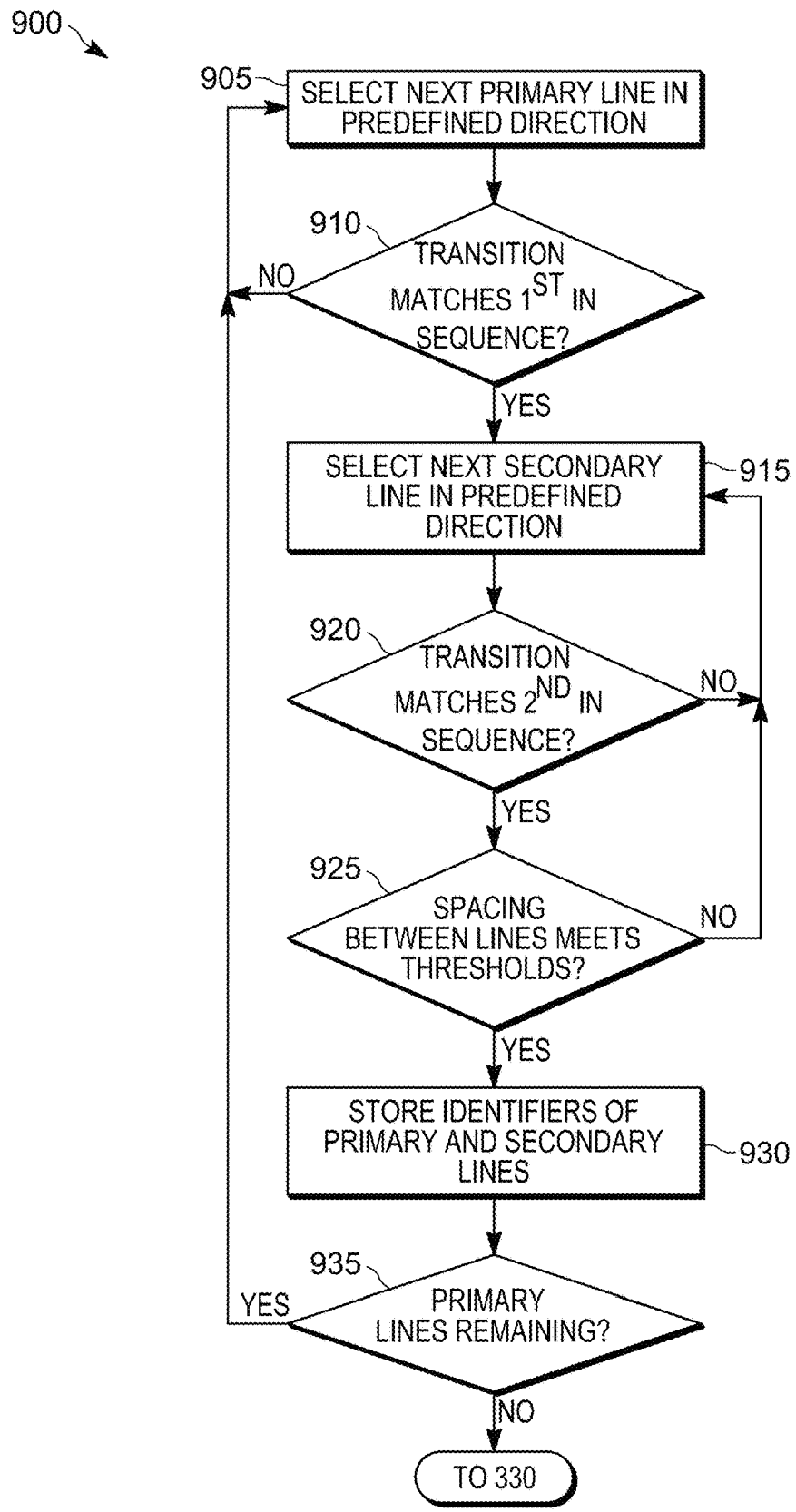
FIG. 9 is a method of identifying candidate line pairs in the method of FIG. 3.

Turning to FIG. 9, a method 900 of identifying pairs of candidate shelf lines is shown, as performed by the region generator 212. At block 905, the region generator 212 is configured to select a candidate shelf line 800 as a primary line, beginning from a preconfigured side of the image 500 and traversing the image 500 in a preconfigured direction. For example, the region generator 212 may be configured to begin at the top of the image 500, in the orientation depicted in FIG. 8, and thus to select the line 800-1 at block 905. At block 910, the region generator 212 is configured to determine whether the selected primary line has an expected first transition. In the present example, the first expected transition is a transition from dark (i.e., low intensity) to light (i.e., high intensity). The nature of the transition can be determined by the region generator 212, for example, by referring to the gradients determined earlier for the candidate pixels used to define the selected candidate shelf line.

In the present example, the determination at block 910 with respect to the line 800-1 is affirmative, and the performance method 900 therefore proceeds to block 915. If the determination at block 910 is negative, the next candidate shelf line is selected at block 905.

At block 915, a secondary line is selected, in the form of the next line (after the current primary line) in the above-mentioned direction of travel. In the present example, as seen from FIG. 8, the line 800-2 is the next line following the line 800-1. At block 920, the region generator 212 is configured to determine whether the selected secondary line has an expected second transition, which is typically opposite the first transition. Thus, in the present example, at block 915 the region generator 212 determines whether the line 800-2 has a light to dark transition. When the determination at block 920 is negative, the next secondary line is selected (i.e., the region generator 212 returns to block 915). In the present example performance of the method 900, however, the determination at block 920 is affirmative, and the region generator 212 therefore proceeds to block 925.

At block 925, the region generator 212 may also be configured to determine whether a distance between the primary and secondary lines meets one or more thresholds. For example, the region generator 212 can store one or both of a preconfigured upper threshold, beyond which a pair of candidate shelf lines are too distant to represent a shelf edge 118, and a preconfigured lower threshold, below which a pair of candidate shelf lines are too close to represent a shelf edge 118. If the distance threshold(s) evaluated at block 925 are not satisfied, a further secondary line is selected at block 915 (or, if no further secondary lines are available, the next primary line is selected at block 905). If the distance thresholds at block 925 are satisfied, however, the region generator 212 proceeds to block 930, at which the region generator 212 is configured to store identifiers of the current pair of primary and secondary candidate shelf lines, for example in a list of line pairs likely to represent shelf edges 118.

The region generator 212 is then configured to determine at block 935 whether any primary lines remain to be processed. Any shelf candidate lines that have not already been selected as primary lines at block 905, or that have not been successfully paired as secondary lines, are processed as further primary lines via further performances of blocks 905-930. Referring again to FIG. 8, it will be apparent that the line 800-3 satisfies the determination at block 910, but that neither of the lines 800-4 and 800-5 successfully pair with the line 800-3 (the line 800-4 having the wrong transition, and the line 800-5 being too distant from the line 800-3). The lines 800-4 and 800-5, however, are identified as another pair and stored at block 930.

Figure 10:
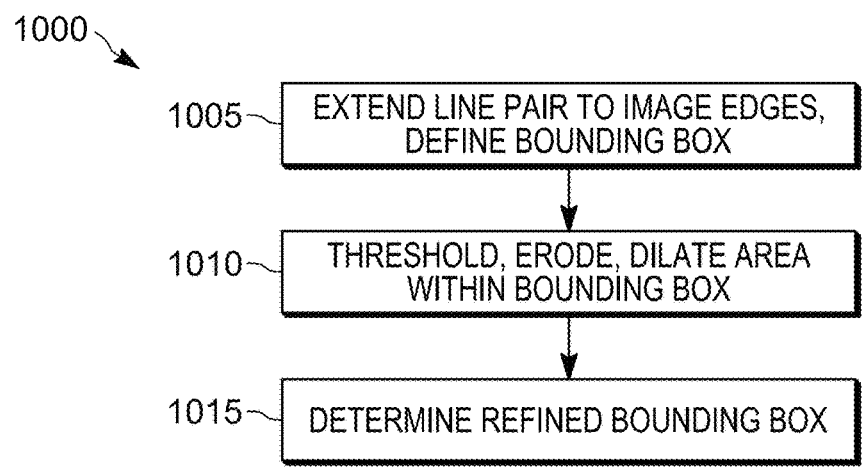
FIG. 10 is a method of generating bounding boxes based on the lines generated via the method of FIG. 7A.

Returning to FIG. 3, at block 330 the region generator 212 is configured to generate and store bounding boxes corresponding to the pairs of lines identified at block 325. The bounding boxes generated at block 330 identify the locations of the shelf edges 118 in the image data. In some examples, the region generator 212 is configured to generate a bounding box for each pair identified by the endpoints of the lines in the pair (i.e., four endpoints defining a bounding box). In other examples, however, the region generator 212 can be configured to further refine the region of the adjusted image 500, for example via a method 1000 shown in FIG. 10.

Figure 11:
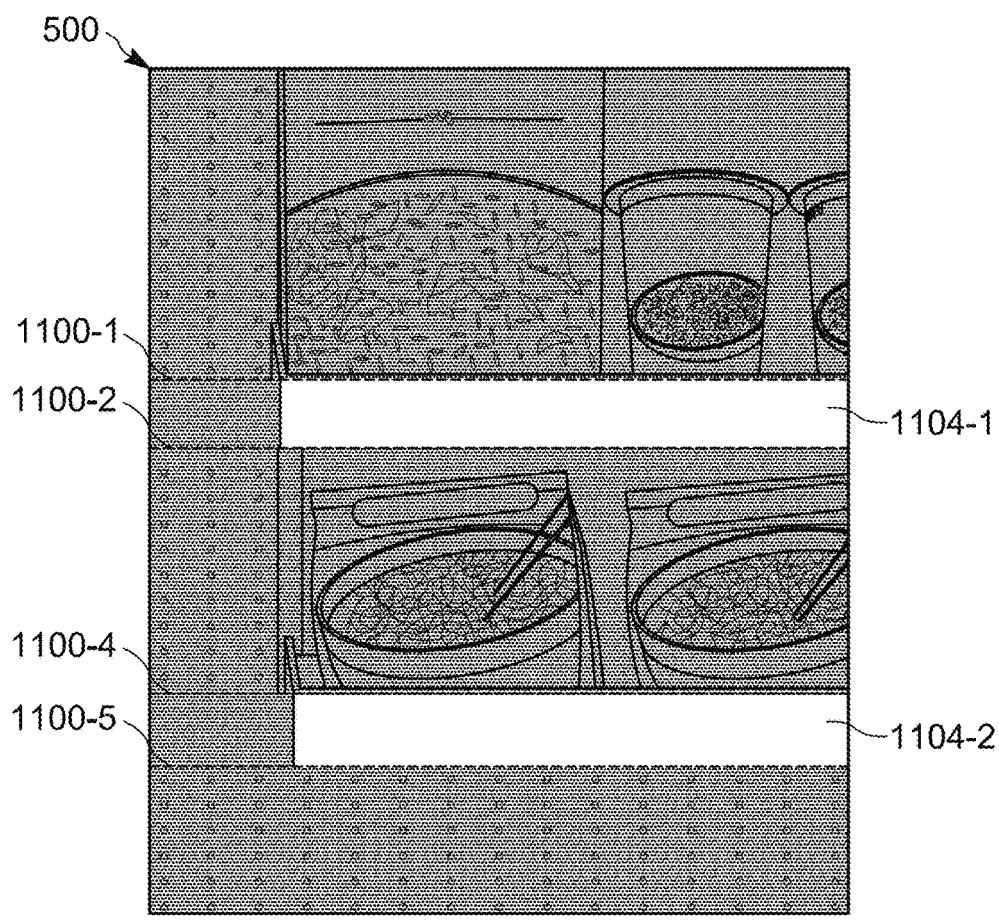
FIGS. 11-12 illustrate the results of the method of FIG. 10.

At block 1005, the region generator 212 is configured to extend each line pair to the edges of the adjusted image 500. Referring to FIG. 11, the adjusted image 500 is shown with extended lines 1100-1, 1100-2, 1100-4 and 1100-5, corresponding to the lines 800-1, 800-2, 800-4 and 800-5. The initial bounding box is the area between the image edges and the extended lines 1100.

At block 1010, the region generator 212 is configured to perform a morphological opening operation on the area of the adjusted image 500 within the each initial bounding box. The morphological opening operation may include, for example, the application of a threshold (to convert the initial bounding box to binary intensities), followed by erosion and dilation. FIG. 11 illustrates the results of block 1010. In particular, a shelf mask 1104-1, 1104-2 is generated via the morphological opening operation.

Figure 12:
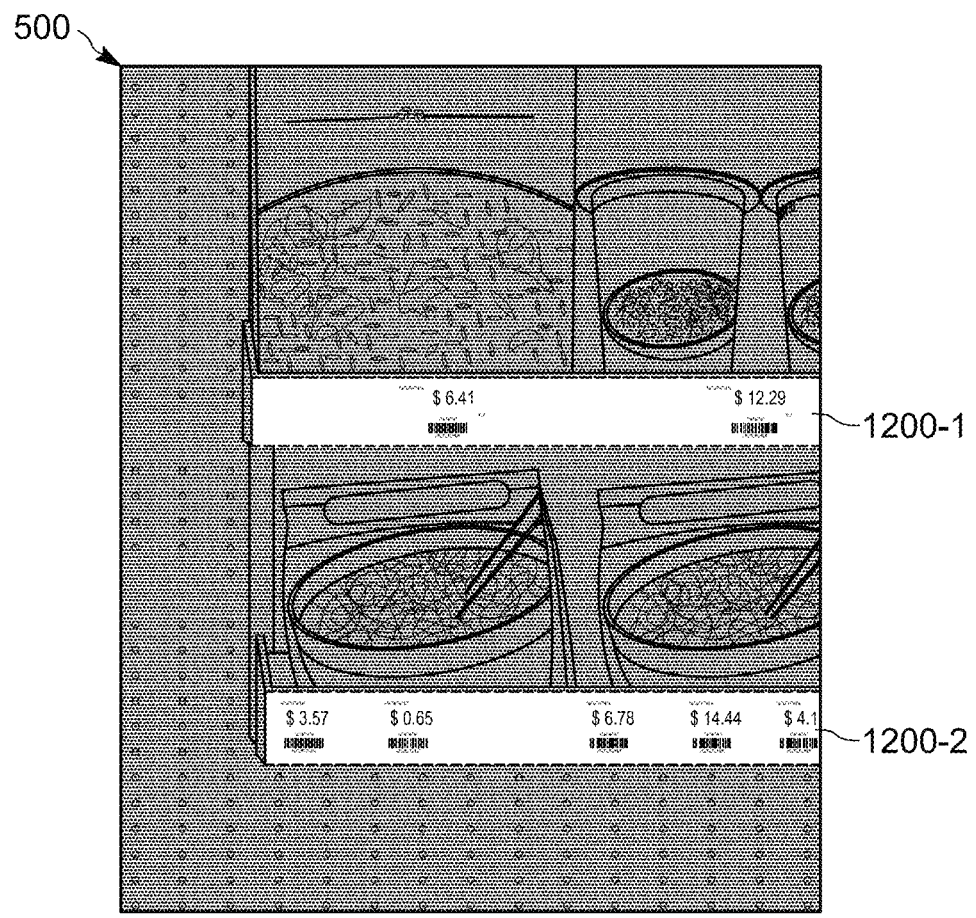

At block 1015, the region generator 212 is configured to determine a refined bounding box by fitting a box to the above-mentioned shelf mask. Turning to FIG. 12, refined bounding boxes 1200-1 and 1200-2 are illustrated over the adjusted image 500. When the generation of the refined bounding boxes 1200 is complete, the region generator 212 is configured to store the bounding boxes (e.g., by storing the image coordinates of the corners of each box) in the memory 122 (e.g., in the repository 132).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method of detecting a shelf edge by an imaging controller, comprising:
   obtaining, by the imaging controller, an image depicting a shelf;
   increasing an intensity of a foreground subset of image pixels in the image, wherein each pixel in the foreground subset of pixels has an initial intensity that exceeds an upper intensity threshold, and decreasing an intensity of a background subset of pixels in the image, wherein each pixel in the background subset of pixels has an initial intensity that is below a lower intensity threshold;
   responsive to the increasing and the decreasing, (i) determining gradients for each of the pixels and (ii) selecting a candidate set of the pixels based on the gradients;
   overlaying a plurality of shelf candidate lines on the image derived from the candidate set of pixels;
   identifying a pair of the shelf candidate lines satisfying a predetermined sequence of intensity transitions; and
   generating a shelf edge bounding box corresponding to the pair of shelf candidate lines.

2. The method of claim 1, further comprising downsampling the image prior to the increasing and the decreasing.

3. The method of claim 1, further comprising:
   adjusting an intensity of an intermediate subset of pixels having intensities between the upper intensity threshold and the lower intensity threshold.

4. The method of claim 3, further comprising:
   prior to the increasing, the decreasing and the adjusting, determining intensity adjustment parameters by comparing pixel populations of the foreground subset and the background subset to target foreground and background populations.

5. The method of claim 1, wherein selecting the candidate set of pixels comprises selecting pixels presenting locally maximal gradients in an orientation perpendicular to an expected orientation of the shelf edge.

6. The method of claim 1, wherein the identifying further comprises determining whether the pair of shelf candidate lines satisfying the predetermined sequence satisfies a spacing criterion.

7. The method of claim 6, wherein the spacing criterion defines a minimum distance between the pair of shelf candidate lines and a maximum distance between the pair of shelf candidate lines.

8. The method of claim 1, further comprising storing the shelf edge bounding box in a memory.

9. A computing device for detecting shelf edges, comprising:
   a memory; and
   an imaging controller, coupled to the memory, the imaging controller including:
      a preprocessor configured to obtain an image depicting a shelf, and to increase an intensity of a foreground subset of pixels in the image, wherein each pixel in the foreground subset of pixels has an initial intensity that exceeds an upper intensity threshold, and decrease an intensity of a background subset of pixels in the image, wherein each pixel in the background subset of pixels has an initial intensity that is below a lower intensity threshold;
      a selector configured, responsive to the increasing and the decreasing, to (i) determine gradients for each of the pixels and (ii) select a candidate set of the pixels based on the gradients;
      a line generator configured to overlay a plurality of shelf candidate lines on the image derived from the candidate set of pixels; and
      a region generator configured to identify a pair of the shelf candidate lines satisfying a predetermined sequence of intensity transitions; and
   the imaging controller configured to generate a shelf edge bounding box corresponding to the pair of shelf candidate lines in the memory.

10. The computing device of claim 9, wherein the preprocessor is further configured to downsample the image prior to the increasing and the decreasing.

11. The computing device of claim 9, wherein the preprocessor is further configured to:
    adjust an intensity of an intermediate subset of pixels having intensities between the upper intensity threshold and the lower intensity threshold.

12. The computing device of claim 11, wherein the processor is further configured to:
    prior to the increasing, the decreasing and the adjusting, determine intensity adjustment parameters by comparing pixel populations of the foreground subset and the background subset to target foreground and background populations.

13. The computing device of claim 9, wherein the selector is further configured to select the candidate set of pixels by selecting pixels presenting locally maximal gradients in an orientation perpendicular to an expected orientation of the shelf edge.

14. The computing device of claim 9, wherein the region generator is further configured to identify the pair of shelf candidate lines by: determining whether the pair of shelf candidate lines satisfying the predetermined sequence satisfies a spacing criterion.

15. The computing device of claim 14, wherein the spacing criterion defines a minimum distance between the pair of shelf candidate lines and a maximum distance between the pair of shelf candidate lines.

16. The computing device of claim 9, wherein the imaging controller is further configured to store the shelf edge bounding box in the memory.

* * * * *